United States Patent Office 2,884,309
Patented Apr. 28, 1959

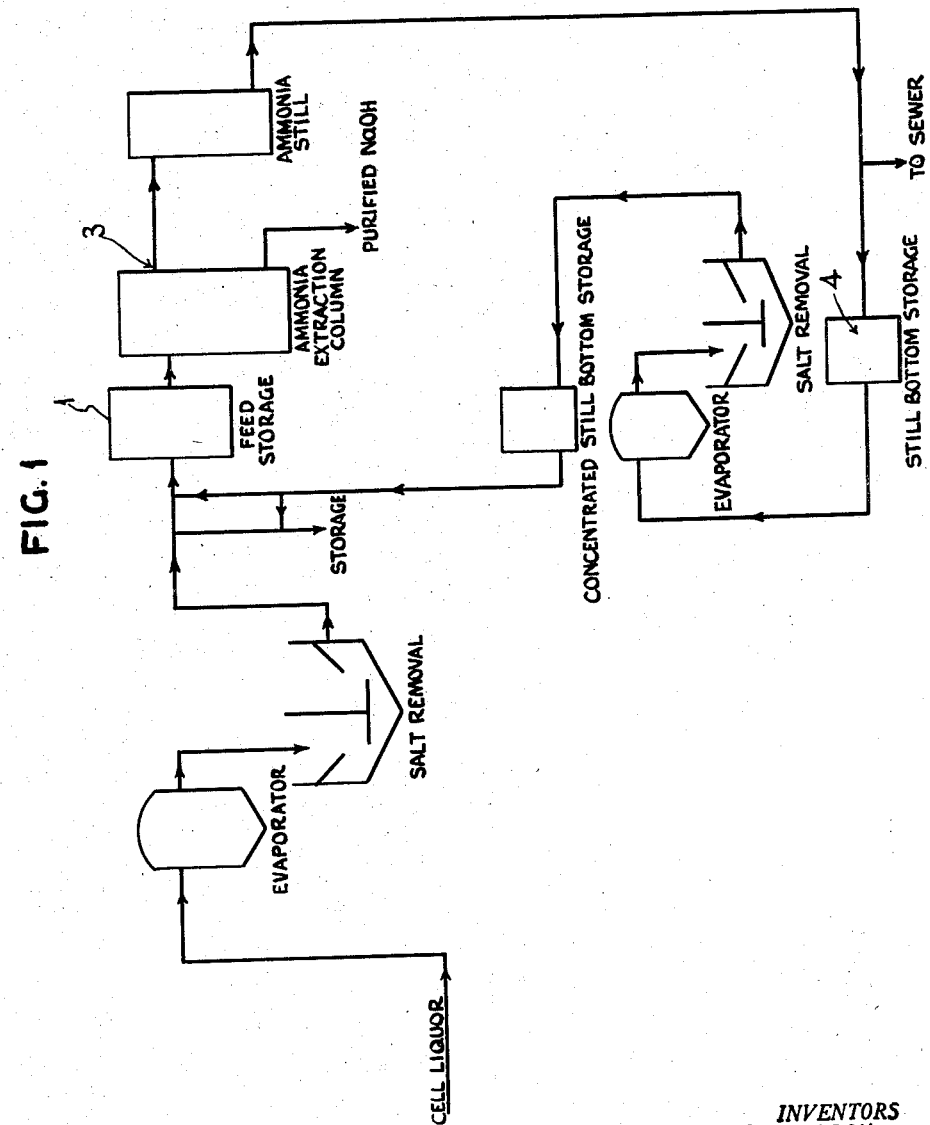

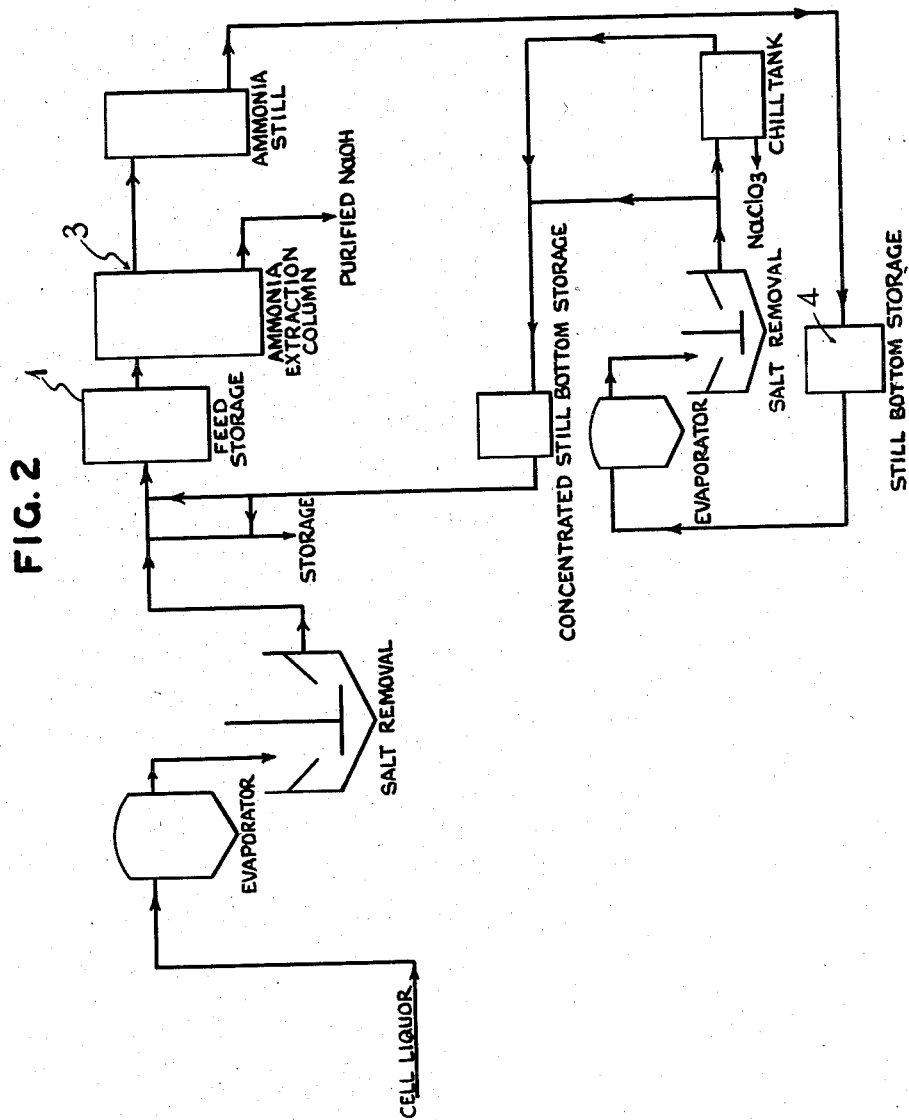

2,884,309

PURIFYING ALKALI METAL HYDROXIDE SOLUTIONS

Gordon A. Carlson, New Martinsville, Shannon W. Brown, Moundsville, and Joseph E. Zettel, New Martinsville, W. Va., assignors to Columbia-Southern Chemical Corporation, Allegheny County, Pa., a corporation of Delaware Application September 2, 1953, Serial No. 378,138

6 Claims. (Cl. 23—184)

This invention relates to an improvement in the process of purifying aqueous alkali metal hydroxide with liquid ammonia. The term "liquid ammonia," as used herein, is intended to include both anhydrous liquid ammonia as well as aqueous liquid mixtures of ammonia and water, particularly those containing in excess of about 80 percent $NH_3$.

Aqueous caustic soda as produced by the diaphragm type electrolytic cell contains an appreciable amount of sodium chloride and concentrations of sodium chlorate ranging from 0.1 to 0.5 percent by weight on the anhydrous basis. One very effective method of purifying this alkali metal hydroxide and removing sodium chloride and sodium chlorate is to extract the alkali metal hydroxide in aqueous solution with liquid ammonia. This process is described in considerable detail in U. S. Patents Nos. 2,196,594 and 2,196,595, granted to Irving E. Muskat on April 9, 1940. A further detailed embodiment of this process is disclosed in U. S. Patent No. 2,622,009, granted to Joseph A. Neubauer et al. on December 16, 1952, disclosure of which is herein incorporated by reference.

In the practice of the processes of these patents, the liquid ammonia is mixed with aqueous alkali metal hydroxide, such as aqueous sodium hydroxide, containing in excess of about 40 to 45 percent by weight of NaOH, and a pair of liquid phases is separated. The heavier liquid phase contains most of the caustic soda together with minor concentrations of impurities. The lighter phase contains most of the ammonia, approximately 2 to 10 percent by weight, usually about 4 percent of the alkali metal hydroxide, together with most of the sodium chloride and essentially all of the sodium chlorate. This lighter phase is then treated to distill off the ammonia which is recycled. The residue is seriously contaminated with sodium chlorate, usually containing from about 5 to 10 percent by weight of sodium chlorate on the anhydrous basis. Frequently, this mixture has been discarded because of its contamination. In other cases, it has been mixed with caustic soda of higher purity and sold to fields where freedom of the caustic from chlorate is not necessary. Both of these expedients are unsatisfactory. In the first place, discarding of the mixture (hereinafter sometimes called "still bottoms") is costly. Mixing with a purer caustic soda simply degrades the caustic soda and therefore is not a satisfactory practice. At the same time, however, there is a definite limit upon the amount of money which can be spent in the recovery of caustic soda from these "still bottoms" because of the volume of "still bottoms" produced and also because caustic soda itself is an essentially low cost chemical.

According to the present invention, a method has been provided by which at least a substantial portion of the caustic soda in these "still bottoms" may be recovered in a simple and inexpensive manner. In the practice of this process, the ammonia is removed from the lighter ammonia phase and the resulting "still bottoms" which are relatively dilute, usually containing only about 5 to 15 percent by weight of NaOH, are evaporated to a NaOH concentration above about 40 to 45 percent by weight, usually in the range of 45 to 55 percent by weight of NaOH, and a solution containing at least about 0.9 pound of sodium chlorate per 100 pounds of NaOH is produced. This solution is then treated with liquid ammonia in a second step to fractionate a major portion of the sodium hydroxide in relatively pure state and to produce a second liquid ammonia phase from which the ammonia can be removed readily.

This second liquid ammonia phase normally contains from 12 to 20 percent by weight or more of sodium chlorate after removal of the ammonia. A portion of this second batch of "still bottoms" may then be discarded and the balance recycled for further treatment of ammonia. Alternatively, however, it has been found that this product may be evaporated to a NaOH concentration of approximately 40 to 55 percent by weight. In such a case, it is found that where the concentration of chlorate is in excess of 10 percent of the sodium hydroxide, preferably above 15 to 20 percent by weight, a substantial portion of the sodium chlorate can be crystallized from the evaporated liquor. This is particularly true when the crystallization is effected by cooling the evaporated liquor to a temperature below about 30° C., preferably in the range of 10 to 20° C., but above the temperature at which any sizeable quantity of sodium chloride crystallizes. After removal of the crystallized sodium chlorate, the resulting liquor may be recycled.

With NaOH concentrations in the lower portion of the 40 to 55 percent range, for example, 40 to 45 percent, it is generally preferable to crystallize from sodium chlorate concentrations in excess of 15 to 20 percent by weight. On the other hand, higher NaOH concentrations, e. g. 50 to 55 percent, admit of efficient crystallization with somewhat lower sodium chlorate concentrations, i. e., above 10 percent sodium chlorate. The exact chlorate concentration above 10 percent which is preferred, therefore, varies depending on the NaOH concentration; the higher the NaOH concentration, the lower the minimum chlorate concentration.

According to a further embodiment of the invention, it has been found that the process may be performed most efficiently when the "still bottoms," either before or after evaporation, are mixed with additional sodium hydroxide. If an aqueous mixture of sodium hydroxide and sodium chlorate produced by the ammonia treatment above described and containing about 10 pounds of sodium chlorate per 100 pounds of sodium hydroxide is further treated with liquid ammonia, both phases are found to be contaminated with sodium chlorate. This is objectionable.

According to this invention, this difficulty may be avoided by adding sodium hydroxide to the "still bottoms" and thereby reducing the ratio of sodium chlorate to sodium hydroxide. For most purposes, the amount of such sodium hydroxide which is added should be sufficient to effect a substantial reduction of the sodium chlorate-sodium hydroxide ratio and preferably to a range of about 0.9 to 5 pounds of sodium chlorate per 100 pounds of sodium hydroxide. By so doing, it is possible to extract the resulting product with liquid ammonia and to produce a caustic soda phase which contains little or no chlorate.

Figures 1 and 2 refer to particularly effective methods of practicing this process. As shown in these figures, electrolytic cell liquor which usually contains 8 to 14 percent by weight of NaOH, and which is saturated with sodium chloride and contains up to about 0.5 percent by weight of sodium chlorate on the anhydrous basis, is fed to an evaporator where it is evaporated to a concentration above 40 percent NaOH by weight, usually in the range of 45 to 55 percent by weight. As a consequence of this operation, sodium chloride crystallizes out and is removed.

This product is then fed to storage tank 1. The resulting concentrated sodium hydroxide is fed from this storage tank to a conventional column for extraction with liquid ammonia. Purified sodium hydroxide containing small amounts of ammonia is withdrawn from the bottom of this column and processed in the conventional way. The lighter liquid ammonia phase is withdrawn from the top of the column at 3 and is sent to an ammonia still where ammonia is driven off. The resulting product contains about 5 to 15 percent by weight of NaOH but also contains about 5 to 10 percent by weight of sodium chlorate on the anhydrous basis. This product is accumulated in "still bottoms" storage 4 until a substantial store has been obtained and then is evaporated to a concentration above 40 percent NaOH and the precipitated sodium chloride is removed. Thereafter, the sodium hydroxide containing the high concentration of sodium chlorate is mixed with sodium hydroxide of a lower content of sodium chlorate to reduce the chlorate content to a point where it is approximately 0.9 to 5 pounds of sodium chlorate per 100 pounds of sodium hydroxide. This product is then recycled to the ammonia extraction column and is further treated.

The resulting caustic phase is withdrawn from the bottom of the ammonia extraction column and is recovered in a relatively pure form, substantially free from chlorate. The lighter ammonia phase is treated to remove ammonia and the second batch of "still bottoms" is obtained. This product normally contains an appreciable concentration of sodium chlorate, usually in excess of about 12 pounds of sodium chlorate per 100 pounds of sodium hydroxide. A portion of this material may be discarded and the balance recycled as above described. Alternatively, the product may be concentrated in its entirety to a concentration of about 40 percent NaOH and thereafter cooled by supplying to a chilled tank or suitable cooler, shown in Figure 2, to crystallize out of solution sodium chlorate. Following this crystallization, the sodium chlorate may be removed from the solution and the balance of the solution may be recycled.

By performance of the present process, it is possible to remove chlorate from the system without appreciable loss of caustic soda. That is, by accumulating a quantity of the "still bottoms" and further treating this quantity, preferably by dilution with NaOH, the ratio of sodium chlorate to sodium hydroxide in the "still bottoms" is thereby increased by 50 or 100 percent or even higher. Thus, a larger amount of sodium chlorate may be removed from the system by removal of a portion of the "still bottoms" of higher sodium chlorate concentration.

In a typical embodiment of this invention, a caustic soda solution containing 0.1 to 0.8 percent by weight of chlorate on the anhydrous basis is fed into the top of an extraction column and liquid ammonia fed into the bottom, the proportions and other conditions of operation being substantially those disclosed in the above identified Letters Patent granted to Neubauer et al. The caustic soda phase is collected and processed in the conventional manner.

The ammonia phase is withdrawn from the top of the column and, after distillation of the ammonia, is found to contain about 7.5 percent by weight of NaOH on the solution basis, about 8.22 percent by weight of sodium chlorate on an anhydrous NaOH basis, and 54.11 percent by weight of NaCl on the anhydrous basis. The amount of NaOH in these "still bottoms" is about 4 percent of the NaOH fed to the column.

Operation is continued over a period of several days during which these "still bottoms" are collected and mixed with dilute sodium hydroxide solution such as derived by caustic from the sodium chloride filtered from evaporated cell liquor. The proportions of such dilute NaOH added are enough to produce a mixture which contains 2.15 percent by weight of sodium chlorate.

Thereupon, this solution is concentrated and then mixed with concentrated electrolytic cell liquor to produce a solution containing in excess of about 0.9 percent sodium chlorate on the anhydrous basis and is extracted with liquid ammonia in the extraction column, producing further purified NaOH solution and a "still bottoms" fraction which contains above 12 percent by weight of sodium chlorate on the anhydrous NaOH basis, a typical concentration being 20.98 percent.

Chlorate may be removed from the system by discarding a portion of the "still bottoms," mixing with caustic soda to be used in other processes, and/or by concentrating the "still bottoms" and crystallizing out sodium chlorate. The sodium hydroxide thus obtained may be recycled.

After the collected "still bottoms" have been treated, the process is then repeated by evaporating electrolytic cell liquor, removing the precipitated sodium chloride, and treating the resulting sodium hydroxide as described in the above identified patents. This is continued without feeding "still bottoms" to the cycle until a sufficient amount, for example, 800,000 gallons, of "still bottoms" is collected. At that time the "still bottoms" are evaporated and again cycled to the liquid ammonia extraction column as described above.

The following table illustrates the average conditions of several days' continuous operation in this manner:

*Table I*

|  | Sodium chlorate content of Caustic soda fed to the Extractor (anhydrous basis) | Sodium chlorate content of Still Bottoms (anhydrous NaOH basis) |
| --- | --- | --- |
|  | *Percent* | *Percent* |
| 1st day | 0.30 | 13.22 |
| 3rd day | 0.34 | 8.22 |
| 5th day | 0.45 | 12.64 |
| 8th day | 0.54 | 11.33 |
| 9th day | 1.12 | 16.02 |
| 10th day | 0.93 | 20.98 |
| 11th day | 0.72 | 19.05 |
| 12th day | 0.57 | 13.55 |

Thus, for the first eight days, caustic soda containing 0.3 to 0.54 percent of chlorate was fed to the extractor and "still bottoms" containing from 8.22 to 13.22 percent by weight of chlorate were collected. On the ninth and tenth days, a portion of these "still bottoms" was mixed with the usual feed and the mixture was fed to the extraction column. This caused an increase in the chlorate content of the "still bottoms" to 20.98 percent. A portion of this product is removed from the cycle or chlorate is crystallized therefrom. On the eleventh day, feeding of the caustic soda "still bottoms" was discontinued and a product of the normal lower chlorate content was produced (note results on 11th and 12th days). This resulted in a decrease in the chlorate content of the "still bottoms" which were then accumulated for treatment.

When the process is conducted by crystallizing chlorate from the "still bottoms," the chlorate should be recycled until it exceeds a concentration of 12 pounds and preferably is in excess of 15 pounds per 100 pounds of alkali metal hydroxide, such as sodium hydroxide. Then the "still bottoms" are evaporated to 40 to 45 percent by weight NaOH concentration and the chlorate crystallized therefrom.

According to an effective embodiment of this process, this chlorate crystallization can be conducted under conditions which separate sodium chloride therefrom. In such a case, the sodium chloride crystallized from solution during evaporation is removed while the temperature of the solution is relatively high, for example, above about 40° C. Thereafter, the solution may be cooled to crystallize the chlorate, together with some sodium chloride, to a temperature of 5 to 30° C.

The process described above is especially useful for purification of sodium hydroxide. However, other alkali metal alkaline materials, such as potassium hydroxide, lithium hydroxide, caustic potash, etc. may be purified in the same manner.

Although the present invention has been described with reference to the specific details of certain embodiments thereof, it is not intended that such details shall be regarded as limitations upon the scope of the invention except insofar as included in the accompanying claims.

What is claimed is:

1. In the method of purifying aqueous sodium hydroxide containing chlorate by extraction of liquid ammonia to produce and separate a purified sodium hydroxide phase from an ammonia phase containing sodium hydroxide and chlorate, the improvement which comprises collecting sodium hydroxide and chlorate from the ammonia phase, subjecting the sodium hydroxide so collected to extraction with further liquid ammonia whereby to produce a further ammonia phase of higher chlorate concentration than the first named phase, continuing said treatment until an ammonia phase is produced in which the concentration of chlorate exceeds 12 pounds per 100 pounds of sodium hydroxide, and crystallizing chlorate from the sodium hydroxide solution in said final ammonia phase.

2. In the process of purifying a feed solution of aqueous sodium hydroxide containing chlorate by extraction with liquid ammonia to produce and separate a purified caustic soda liquid from an ammonia liquid phase containing sodium hydroxide and in excess of 5 pounds of chlorate per 100 pounds of sodium hydroxide, the improvement which comprises adding a further portion of said feed solution to the mixture of sodium hydroxide and chlorate of said ammonia phase to the point where the chlorate content of the resulting mixture is about 0.9 to 5 pounds by weight per 100 pounds of sodium hydroxide, and extracting the resulting mixture with enough liquid ammonia to produce a second purified liquid caustic soda phase and a second liquid ammonia phase containing chlorate higher in concentration than that of the first mentioned liquid ammonia phase, and separating said second caustic soda phase from said second ammonia phase.

3. A method of purifying a feed solution of aqueous alkali metal hydroxide produced by electrolysis of alkali metal chloride in a diaphragm cell and containing chlorate, which comprises extracting the alkali metal hydroxide solution with liquid ammonia to produce and separate a purified alkali metal hydroxide liquid phase from an ammonia liquid phase containing alkali metal hydroxide and chlorate, mixing the alkali metal hydroxide and chlorate from said ammonia phase with a further portion of said aqueous alkali metal hydroxide feed solution produced by electrolysis of alkali metal chloride whereby to substantially increase the ratio of alkali metal hydroxide to chlorate, and extracting the resulting product with enough liquid ammonia to produce a second purified liquid alkali metal hydroxide phase and a second ammonia phase containing alkali metal hydroxide and an amount of chlorate higher in concentration than that of the first mentioned liquid ammonia phase, and separating the second ammonia phase from the second alkali metal hydroxide phase.

4. The process of claim 3 wherein the alkali metal hydroxide is sodium hydroxide.

5. A method of purifying a feed solution of aqueous sodium hydroxide produced by electrolysis of sodium chloride in a diaphragm cell and containing chlorate, which comprises extracting the sodium hydroxide solution with liquid ammonia to produce and separate a purified caustic soda liquid phase from an ammonia liquid phase containing sodium hydroxide and chlorate, removing ammonia from said ammonia phase and concentrating the resulting dilute solution of sodium hydroxide and chlorate of the ammonia phase to a concentration above about 40% by weight of NaOH, mixing the resulting sodium hydroxide and chlorate of the ammonia phase with further sodium hydroxide feed solution in amount sufficient to increase the sodium hydroxide chlorate ratio to the point where the resulting mixture contains about .9 to 5 pounds by weight of chlorate per 100 pounds of sodium hydroxide, and extracting the resulting mixture with enough liquid ammonia to produce a second purified liquid caustic soda phase and a second liquid ammonia phase containing an amount of chlorate higher in concentration than that of the first mentioned liquid ammonia phase and separating said second caustic soda phase from said second ammonia phase.

6. In the process of purifying aqueous sodium hydroxide, which has been produced by electrolysis of aqueous sodium chloride in a diaphragm cell and which contains chlorate, by extraction with liquid ammonia to produce a purified liquid sodium hydroxide phase and a separate liquid ammonia phase containing sodium hydroxide, water, and chlorate, the improvement which comprises adding sodium hydroxide to the mixture of sodium hydroxide and chlorate of the ammonia phase and thereby to reduce the chlorate content of the sodium hydroxide of the ammonia phase to 0.9 to 5 pounds of chlorate per 100 pounds of sodium hydroxide, extracting the resulting mixture with liquid ammonia to cause separation of a second purified sodium hydroxide phase from a second liquid ammonia phase containing sodium hydroxide and chlorate, continuing this process until the amount of chlorate in the sodium hydroxide of the ammonia phase is above 12 pounds per 100 pounds of sodium hydroxide, adjusting the concentration of such sodium hydroxide to the point where the sodium hydroxide content thereof is in excess of 40 percent by weight, and crystallizing chlorate from the resulting solution.

References Cited in the file of this patent

UNITED STATES PATENTS

| | | |
|---|---|---|
| 1,733,879 | Hooker et al. | Oct. 29, 1929 |
| 2,196,594 | Muskat | Apr. 9, 1940 |
| 2,285,299 | Muskat et al. | June 2, 1942 |
| 2,325,339 | Muskat | July 27, 1943 |
| 2,354,823 | Muskat et al. | Aug. 1, 1944 |
| 2,622,009 | Neubauer | Dec. 16, 1952 |

OTHER REFERENCES

Journal Amer. Chem. Soc., vol. 42 (1920), pp. 1448–1454, article by J. N. Bronsted.

UNITED STATES PATENT OFFICE

CERTIFICATE OF CORRECTION

Patent No. 2,884,309

April 28, 1959

Gordon A. Carlson et al.

It is hereby certified that error appears in the above numbered patent requiring correction and that the said Letters Patent should read as corrected below.

In the heading to the drawings, Sheets 1 and 2, line 2, and in the heading to the printed specification, lines 2 and 3, title of invention, for "PURIFYING ALKALI METAL HYDROXIDE SOLUTIONS", each occurrence, read -- IMPROVEMENT IN PURIFYING ALKALI METAL HYDROXIDE SOLUTIONS --.

Signed and sealed this 5th day of April 1960.

(SEAL)
Attest:

KARL H. AXLINE

Attesting Officer

ROBERT C. WATSON
Commissioner of Patents